June 10, 1947. G. L. BORELL 2,422,162
CONTROL SYSTEM
Filed Feb. 25, 1944 2 Sheets-Sheet 2
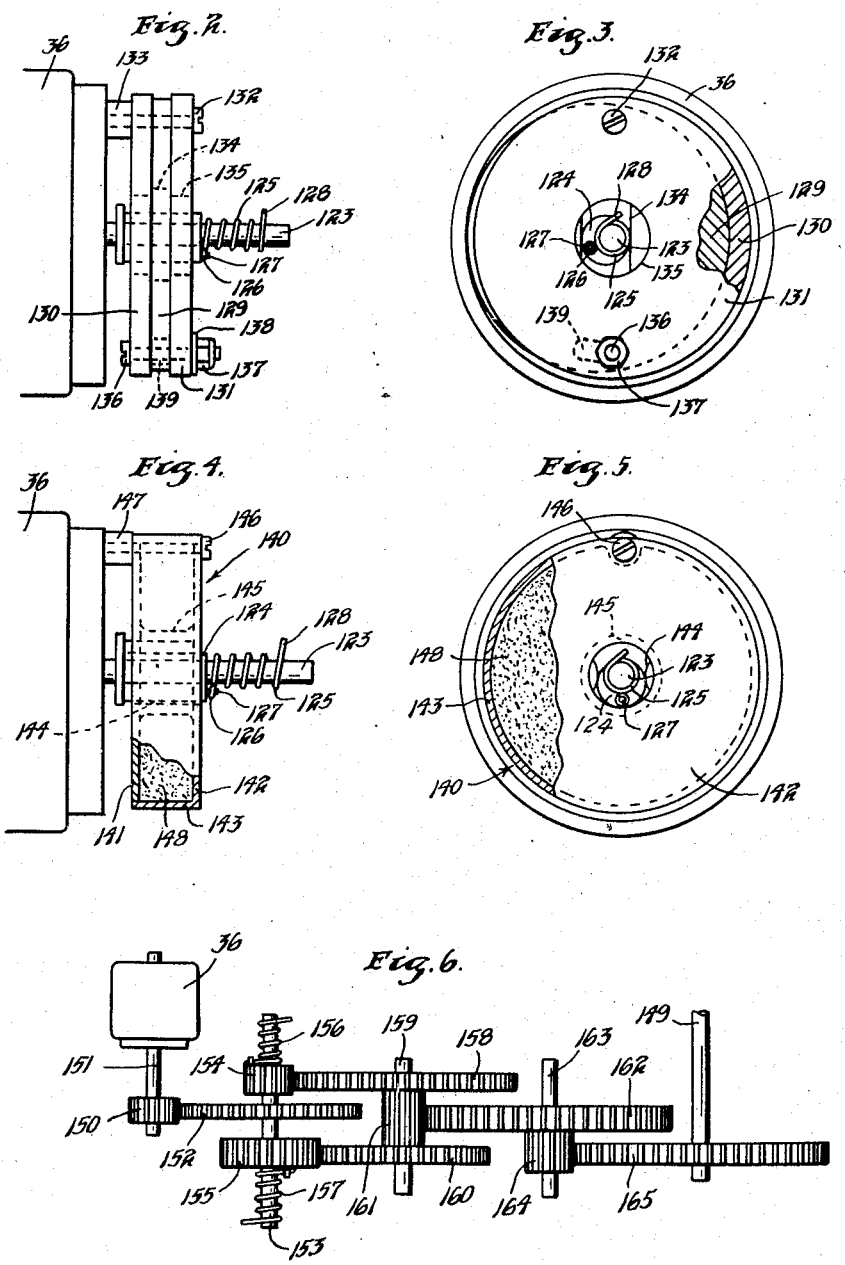
Inventor
GEORGE L BORELL
By
George H. Fisher
Attorney Patented June 10, 1947

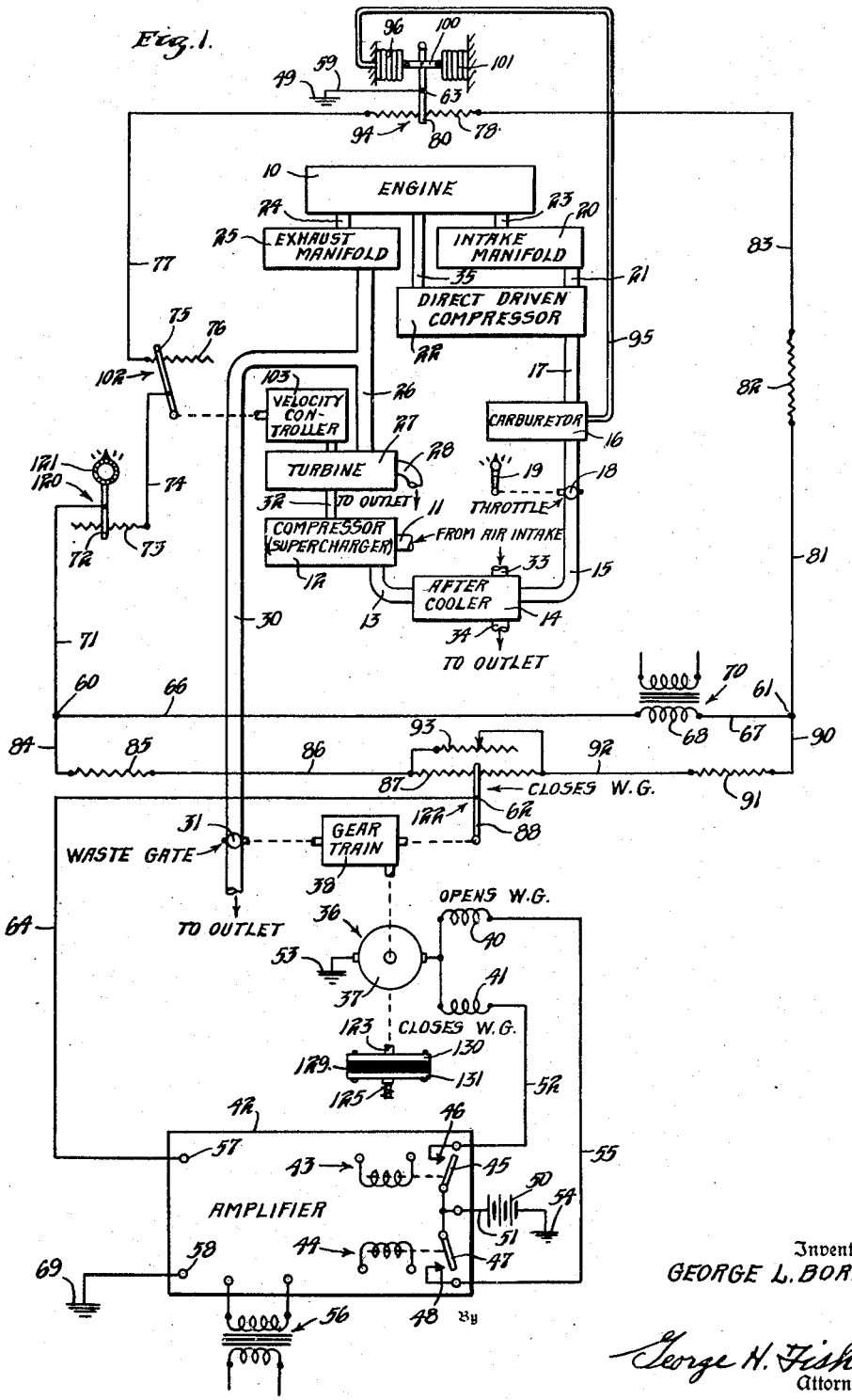

2,422,162

UNITED STATES PATENT OFFICE 2,422,162

CONTROL SYSTEM

George L. Borell, Minneapolis, Minn., assignor to Minneapolis-Honeywell Regulator Company, Minneapolis, Minn., a corporation of Delaware Application February 25, 1944, Serial No. 523,872

7 Claims. (Cl. 60—13)

This invention relates generally to control systems of the kind used in connection with internal combustion engines, particularly aircraft engines, for selecting and controlling intake manifold pressures. The invention more particularly relates to a control system wherein over acceleration of the turbine driven compressor, used in such installations, is prevented.

The turbine and compressor operate usually at high speeds and not only must means be provided for limiting these speeds to a safe value, to prevent damage to the parts, but it is also necessary to provide means for limiting the rate of acceleration of the turbine. For example, if the waste gate is closed by operation of the pressure sensing means, in order to satisfy the call thereof for an increase in operating speed of the turbine and compressor due to a sharp decrease in intake manifold pressure below the selected value, there is a pronounced tendency for the speed of the turbine to increase with such rapidity as to cause hunting of the controls and overshooting of the pressure such that the pressure will fluctuate about the selected value, instead of remaining substantially constant. This is, of course, very undesirable.

It is the primary object of my invention to improve control systems of this kind by the provision of a system or means for eliminating the tendency toward over acceleration of the turbine and compressor as the waste gate is closed in the attempt to satisfy the call of the controls for an increase in intake manifold pressure, and thereby to prevent the undesirable hunting and overshooting tendencies of such systems.

Another object is to provide means for preventing over acceleration of the system by the very effective, simple and positive method of causing the waste gate positioning motor to operate the waste gate at a slower speed or rate when closing it, than when it is being opened. Thus the turbine and compressor speed may be quickly reduced when the control system calls for opening movement of the waste gate to reduce intake manifold pressure, while the closing movement of the waste gate is always carried out at a relatively slower and more gradual rate, no matter how rapidly the pressure may fall and how sharply the control system may call for an increase in pressure. It will be evident that the gradual and comparatively slow closing of the waste gate will cause the turbine and compressor speeds to build up slowly, without any tendency to overshoot or to increase the intake manifold pressure too quickly for the control system to maintain effective control thereover.

Another object is to provide means or apparatus of this nature which may be installed as a part of the motor and which is purely mechanical in nature so that complication of the control circuits is avoided and installation in the aircraft, or on the engine, is facilitated.

These and other more detailed and specific objects will be disclosed in the course of the following specification, reference being had to the accompanying drawings, in which Figure 1 is a schematic showing of an engine, its induction system and a control system for controlling the intake manifold pressure, my invention being shown as embodied in the latter.

Figure 2 is a fragmentary side view of the waste gate positioning motor, showing one embodiment of my means for controlling or reducing the speed of rotation of the motor in one direction.

Figure 3 is an end view of the assembly of Figure 2, a part thereof being broken away.

Figure 4 is a view similar to Figure 2 but showing another embodiment of my invention.

Figure 5 is a view similar to Figure 3, but showing the apparatus of Figure 4.

Figure 6 is a somewhat diagrammatical showing of a further modification of my invention.

Figure 1 of the drawings illustrates a control system similar to that shown in Figure 1 of the co-pending application of Hubert T. Sparrow, Serial No. 476,797, filed February 22, 1943, but with said system modified to embody the present invention for controlling rate of response of the waste gate motor, thereby limiting the rate of acceleration of the turbine. Inasmuch as the functioning of the system as a whole is necessary of description herein, in order to understand the need for, and my means for, control of the rate of acceleration it will be described in some detail.

Referring now more particularly to Figure 1, there is schematically shown therein an internal combustion engine 10, which may be the engine of an aircraft. Air for supporting combustion in the engine 10 passes from an intake, not shown in the drawing and conventionally located in the leading edge of the wing of the aircraft, through a conduit 11, a compressor 12, a conduit 13, an after-cooler 14, a conduit 15 in which a throttle 18 is located, a carburetor 16, a conduit 17, a direct-driven compressor 22, a conduit 21, an intake manifold 20, and a conduit 23 to the engine 10.

The exhaust gases from the engine 10 pass through a conduit 24 to an exhaust manifold 25, and thence may pass through a conduit 26, a turbine 27, and a conduit 28 to a suitable outlet, not shown in the drawing.

A conduit 30 connects the conduit 26 with the exhaust gas outlet previously mentioned. In the contact 30 is located a waste gate 31, whose position determines the proportion of the total exhaust gas of the engine that passes through the turbine 26. The compressor 12 is driven by the turbine 27 through a shaft 32.

The after-cooler 14 is provided to reduce the temperature of the air leaving the compressor, wherein its temperature is increased due to the heat of compression. In the after-cooler, the compressed air received from the compressor passes in heat exchange relation with air received from the intake, previously mentioned, through a conduit 33, and discharged through a conduit 34 to the outlet.

In the carburetor 16, fuel from a supply not shown is mixed with the air. The throttle 18 may be positioned by operation of a lever 19. In most carburetors, the throttle is within the carburetor itself. It is shown separately in the drawing merely for convenience.

The compressor 22 is directly driven by the engine 10 through the shaft 35. Such a direct-driven compressor is usually geared so that it rotates faster than the engine, and in many engines it is utilized not only as a compressor, but to distribute evenly the mixture of fuel and air to the various engine cylinders. Although the compressor 22 is shown as separate from the intake manifold, in most cases it is located within the intake manifold.

The waste gate 31 is driven by a motor 36 through a gear train schematically indicated at 38. The motor 36, which is here shown as being of the direct current, series wound type, includes an armature 37 and a pair of field windings 40 and 41. As indicated by the legends in the drawing, the motor and the gear train are so constructed that when field winding 40 is energized the motor rotates in a direction to open the waste gate, and when field winding 41 is energized, the motor rotates in a direction to close the waste gate. As will be more fully explained in connection with Figures 2 and 3, the motor rotates more slowly when closing the waste gate than when opening it.

Energization of motor 36 is controlled by an amplifier 42. The amplifier 42 may be of any suitable type, although I prefer to use one of the type illustrated in Figure 2 of the copending application of Albert P. Upton, Serial No. 437,561, filed April 3, 1942.

The amplifier 42 includes a pair of relays 43 and 44. The relay 43 controls the movements of a switch arm 45 with respect to a stationary contact 46, with which it is engaged when the winding of relay 43 is energized. Similarly, the relay 44 controls the movements of a switch arm 47 with respect to a stationary contact 48, with which it is engaged when the winding of relay 44 is energized.

When switch arm 45 engages contact 46, an energizing circuit is completed for motor 36 which includes field winding 41. This circuit may be traced from the left-hand terminal of a battery 50, through a conductor 51, switch arm 45, contact 46, a conductor 52, field winding 41, armature 37, and ground connections 53 and 54 to the right-hand terminal of battery 50.

When the switch arm 47 engages contact 48, an energizing circuit is completed for motor 36 which includes field winding 40. This circuit may be traced from the left-hand terminal of battery 50 through conductor 51, switch arm 47, contact 48, a conductor 55, field winding 40, armature 37, and ground connections 53 and 54 to the right-hand terminal of battery 50.

The amplifier 42 has signal input terminals 57 and 58, and operates to selectively energize the windings of the relays 43 and 44 in accordance with the phase of an alternating electrical potential applied to the input terminals 57 and 58. Electrical energy is supplied to the amplifier 42 from a transformer 56.

The phase of the electrical potential applied to input terminals 57 and 58 is determined by an electrical network of the Wheatstone bridge type, having input terminals 60 and 61 and output terminals 62 and 63. Output terminal 62 of the bridge circuit is connected through conductor 64 to the input terminal 57 of amplifier 42. Output terminal 63 is connected through conductor 59 and ground connections 49 and 69 to input terminal 58 of amplifier 42. The input terminals 60 and 61 of the bridge circuit are connected through conductors 66 and 67, respectively, to the opposite terminals of a secondary winding 68 of a transformer 70. The transformers 56 and 70 are preferably connected to the same source of alternating electrical energy.

The upper left branch of the bridge circuit, as it appears in the drawing, connects input terminal 60 with output terminal 63. This branch may be traced from input terminal 60 through a conductor 71, a slider 72, a slidewire resistance 73 which cooperates with slider 72, a conductor 72, a slider 75, a slidewire resistance 76 which cooperates with slider 75, a conductor 77, a portion of a slidewire resistance 78, and a slider 80 which cooperates with resistance 78, to the output terminal 63, which is shown as being located on the slider 80.

The upper right branch of the bridge circuit, as it appears in the drawing, connects input terminal 61 with output terminal 63. This branch may be traced from input terminal 61 through a conductor 81, a fixed resistance 82, a conductor 83, a portion of resistance 78, and slider 80 to output terminal 63.

The lower left branch of the bridge circuit, as it appears in the drawing, connects input terminal 60 with output terminal 62. This branch may be traced from input terminal 60 through a conductor 84, a fixed resistance 85, a conductor 86, a portion of a slidewire resistance 87, and a slider 88 cooperating with resistance 87, to output terminal 62, which is shown as being located on slider 88.

The lower right branch of the bridge circuit connects input terminal 61 with output terminal 62, and may be traced from input terminal 61 through a conductor 90, a fixed resistance 91, a conductor 92, a portion of resistance 87, a slider 88 to output terminal 62.

A variable resistance 93 is connected in parallel with the resistance 87, for purposes to be described later.

The slider 80 and the resistance 78 together form a control potentiometer 94. The slider 80 is moved along the resistance 78 in accordance with the absolute pressure of the air supplied by the compressor 12. This pressure may be measured at any point in the path of the air discharged by the supercharger, but is preferably measured at a point fairly remote from the supercharger and preceded by a straight stretch of conduit, so that the effects of turbulence in the flowing air are avoided. In the modification of my invention illustrated in the drawing, I have shown, by way of example, that the pressure for operating the controller 94 is taken from the carburetor 16 through a conduit 95 to an expansible bellows 96. The left end of the bellows 96 is fixed and its right end is free to move in accordance with the pressure existing within the bellows. A link 100 is attached to the free end of the bellows 96. The opposite end of the link 100 is connected to the free end of a second bellows 101, the interior of which is evacuated. An intermediate point on the link 100 is connected, as by a pin and slot connection (not shown), to the slider 80, which is mounted for pivotal movement about its upper end. The opposed bellows compensate this control for variations in ambient air pressures in a well known manner.

The resistance 76 and the slider 75 together form a compensating controller 102. The slider 75 is moved across resistance 76 by a velocity responsive control device 103, which may be of any suitable form, such as that shown in the Sparrow application previously referred to. For present purposes, it is believed sufficient to state that the slider 75 is moved across the resistance 76 in accordance with the velocity of the shaft 32, and that when the velocity of the shaft 32 exceeds a predetermined value, the slider 75 is moved across resistance 76 in accordance with the excess of the shaft velocity above that predetermined value.

The controller 102 previously has been adjusted also in accordance with the acceleration of the shaft 32 but in the present invention this is not required.

The slider 72 and resistance 73 together form a control point adjuster 120, which is manually operable by means of a knob 121. The knob 121 is located so as to be under the control of one of the members of the crew of the aircraft, preferably the pilot.

The slider 88 and resistance 87 together form a rebalancing potentiometer 122. The slider 88 is moved along the resistance 87 by the motor 36, acting through the gear train 38.

*Operation of Figure 1*

When the parts are in the positions shown in the drawing, the waste gate is half open, as indicated by the position of the slider 62 at the midpoint of resistance 87. The bridge circuit is balanced, so that the bridge output terminals 62 and 63 are at the same potential. Hence no signal potential is applied to the input terminals 57 and 58 of amplifier 42, and neither of the relays 43 and 44 is energized. The motor 36 therefore is not energized and the waste gate remains at its half open position.

Now let it be assumed that the pressure of the air in the carburetor 16 decreases, for example, due to an increase in the altitude of the aircraft. Such a decrease in pressure is transmitted to the interior of bellows 96 through the conduit 95. As the pressure inside bellows 96 decreases, the slider 80 is moved to the left along resistance 78. The potential of slider 80, and hence the potential of output terminals 63 and 62 of the bridge circuit, and the phase of this potential, is the same as that which exists between bridge input terminals 60 and 61, respectively. It may be assumed that the amplifier 42 is so connected that it responds to a potential of this phase applied to its input terminals by causing energization of relay 43. Energization of relay 43 completes the energizing circuit for motor 36, previously traced, which causes rotation of motor 36 in a direction to close the waste gate and to move the slider 88 to the left along resistance 87. Movement of slider 88 to the left along resistance 87 changes the potential of output terminal 62 toward that of input terminal 60, so that the potential difference between the output terminals 62 and 63 is reduced. At the same time, movement of the waste gate towards closed position causes an increase in the pressure in the exhaust manifold, and an increasing proportion of the exhaust gases of the engine then passes through the turbine 27, thereby increasing the speed of the turbine and the compressor 12. This increase in speed of the compressor 12 causes an increase in the compression ratio between the output pressure and the input pressure of the compressor. The intake manifold pressure is therefore increased, and the increase is transmitted through the duct 95 to the interior of bellows 96. The increased pressure in bellows 96 moves the slider 80 back to the right along resistance 78. As soon as the sliders 80 and 88 reach positions at which their potentials are the same, the signal potential impressed on the input terminals of amplifier 42 is reduced to zero, and the relay 43 is therefore deenergized. The motor 36 then stops, with the waste gate remaining in a new position. It will be readily understood that the distance moved by the waste gate is proportional to the pressure drop which initiated the movement, the proportion being determined by the ratio between the potential drops per unit length along the resistances 78 and 87.

In a similar manner, an increase in the pressure of the air supplied by the compressor 12 causes a movement of slider 80 to the right along resistance 78, which changes the potential of output terminal 63 with respect to that of output terminal 62 in a sense opposite to that encountered under the conditions previously described. The alternating signal impressed on the input terminals of amplifier 42 is then of a phase opposite to that which was previously impressed on its input terminals. The amplifier 42 responds to this new signal potential by causing energization of the winding of relay 44. This operates switch arm 47 into engagement with contact 48, completing the energizing circuit for motor 36 which includes field winding 40 and causes rotation of the motor in a direction to open the waste gate and to move the slider 88 to the right along resistance 87. This motion continues until the slider 88 has moved a sufficient amount to balance the change in position of slider 80 with respect to resistance 78. The opening movement of the waste gate allows a greater proportion of the total exhaust gases to escape to the atmosphere, thereby reducing the pressure in the exhaust manifold, and reducing the speed of the turbine and compressor which results in a reduction of the intake manifold pressure.

By manipulating the variable resistance 93, the total resistance between the terminals of resistance 87 may be varied, and hence the total potential drop across the resistance 87 is likewise varied. Since the total potential drop is varied, the potential drop per unit length of resistance 87 is changed. Therefore, by changing the variable resistance 93, it is possible to adjust the distance through which the slider 88 must move along resistance 87 in order to balance the bridge circuit after a given unbalancing movement of slider 80 along resistance 78. The resistance 93 may be termed a ratio adjusting resistance, since it determines the ratio between a given movement of the controlling slider 80 and the required following movement of the rebalancing slider 88.

The control point adjuster 120 may be manually operated to increase or decrease the resistance in the upper left branch of the bridge circuit. The setting of controller 120 determines the particular position at which the waste gate is stopped for a given value of pressure existing in the carburetor 16. It may therefore be used to set the value of pressure in the carburetor 16 which the system is to maintain.

It may be desirable for the pilot to select the supercharger discharge pressure within a range of from 15 to 32 inches of mercury. After such a value of discharge pressure has been selected, it is usually desired that the system maintain that pressure within a range of one inch of mercury more or less than the selected value regardless of the altitude of the aircraft. In order to produce these results, resistance 93 should be adjusted so that the effect of resistance 87 is 2/17 of that of resistance 78. In other words, the slider 80 moves from one end to the other of resistance 78 as the pressure at the carburetor varies over a range of 17 inches, and the slider 88 is to move from one end to the other of resistance 87 as the slider 82 moves through a distance corresponding to a pressure change of two inches of mercury. By manipulation of resistance 93, the total resistance between the terminals of resistance element 87 may be varied, so that the operating differential of the system may be varied. The operating differential may be defined as the variation in pressure at the carburetor needed to cause movement of the waste gate from one end to the other of its range.

Since the control point selector 120 must vary the relationship between the control potentiometer 94 and the rebalancing potentiometer 122 over a very wide range of positions of the slider 80, and a relatively narrow range of positions of the slider 88, the resistance of element 73 should be such that its total unbalancing effect on the bridge circuit is comparable to that of resistance 78. Since the compensating controller 102 may be required, under certain conditions as will presently appear, to completely overcome the effect of the main controller 94, resistance 76 should also be such that its unbalancing effect may be comparable to that of resistance 78.

If the proportion of resistance 73 connected in the upper left branch of the bridge circuit is increased, then the resistance of the upper left branch is increased in proportion to the resistance of the upper right branch. An increase in resistance element 73 therefore has the same unbalancing effect on the system as an increase in the intake manifold pressure. Such an increase causes the waste gate to move towards open position, thereby reducing the intake manifold pressure and causing the slider 80 to move to the left along resistance 78. Summarizing, it may be stated that an operation of control point adjuster 120 to increase the proportion of resistance 73 connected in the system lowers the value of intake manifold pressure selected, and an operation of controller 120 to decrease the proportion of resistance element 73 connected in the system operates to increase the pressure selected.

The slider 75 of the compensating controller 102 is moved to the right along the resistance 76 by action of the control device 103 when the velocity of the turbine 77 and compressor 12 approaches a predetermined safe value and as this action takes place the increased value of the resistance 76 inserted in the upper left branch of the bridge circuit causes a response of the amplifier 42 and motor 36 to drive the waste gate 31 toward open position. The result is a tendency toward opposing the unbalance of the bridge circuit which is causing movement of the waste gate towards closed position, and to such extent that the waste gate cannot be closed sufficiently to build up the velocity of the turbine and compressor beyond a safe maximum, even though closing to this extent may be called for by the pressure sensing controller 94. The controller 102 thus operates as a velocity limit control.

When the turbine 27 is accelerating, due to a movement of the waste gate 31 toward closed position, the turbine may continue to accelerate after the pressure controller 94 has been satisfied, because of the inherent lag in the system between the carburetor 16 where the pressure sensing take-off is located, and the exhaust manifold, and because of the inertia of the turbine and compressor. If such an acceleration of the turbine continues after the pressure controller 94 has been satisfied, it causes an abnormal increase in the pressure of the air supplied by the supercharger, which acts through the controller 94 and the system which controls motor 36 to cause a movement of the waste gate back toward its open position. This movement of the waste gate toward open position in turn causes a decrease in the pressure of the air supplied by the compressor, and a hunting condition results in which the pressure being controlled continuously oscillates about the value which it is desired to maintain.

The establishment of such a hunting or overshooting condition is prevented by the provision of means for closing the waste gate slowly enough to limit the rate of acceleration of the turbine 27 and compressor 12, as will now be described.

*Figures 2 and 3*

In Figures 2 and 3 an end portion of the motor 36 is shown from which extends a shaft 123 driven by the motor and which may be the shaft connected through the gear train 38 to the waste gate 31, or an opposite extension thereof. The latter arrangement is diagrammatically shown in Figure 1. An eccentric 124 is freely journaled on the shaft 123 and is connected to rotate therewith, in one direction of rotation thereof, by a self-energizing unidirectional clutch or ratchet means comprising, as here shown, a snubbing spring 125. This spring 125 is a coil spring and frictionally engages the shaft 123, with one end connected by an eye 126 to a pin 127 carried by the eccentric 124. The other end 128 of the spring 125 is loose as shown. In action the shaft 123 may turn freely and independently of the eccentric 124 and spring 125 in one direction but, when the direction of rotation of the shaft is reversed, the spring is tightened by the frictional engagement of the shaft surface with the spring coils, causing the constriction of these coils into gripping engagement with the shaft. The eccentric is then caused to rotate in this direction along with the shaft as will be understood. The engagement and disengagement of the spring is entirely automatic.

The eccentric 124 operates a light follower member or friction disk 129 of fiber, Bakelite or similar material which operates between a pair of comparatively heavy weight members or metallic inertia disks 130 and 131. The three disks 129, 130 and 131 are arranged in frictional surface engagement and are pivoted near one edge on a pivot screw 132 fastened, as at 133, to the end of the motor housing. The friction disk 129 has a central opening 134 elongated in one direction to clear the eccentric 124 and adapted at its sides to ride the same (Figure 3) so that as the eccentric rotates this disk will be oscillated about the axis of the pivot screw 132 as will be apparent. The inertia disks 130 and 131, on the other hand, have large central openings 135 which will clear the eccentric by some distance.

At a point diametrically opposite to the pivot screw 132, a fastening screw 136 is passed through the assembled disks 129, 130 and 131, near their edges, and it is provided with a nut 137 and lock washer 138. The friction disk 129 has a clearance opening 139 which clears this screw 136 at all times.

Operation of Figures 2 and 3

In use the motor 36 is so connected to the waste gate 31 that the shaft 123 rotates free of the eccentric 124 when the waste gate is being opened. The disks 129, 130 and 131 thus are not oscillated while the waste gate is being opened and have no effect on the operation of the motor.

When the motor is reversed to drive the waste gate 31 toward closed position, to speed up the operation of the turbine 27 and compressor 12, the snubbing spring 125 connects the eccentric 124 to shaft 123 causing the eccentric to rotate. This action swings or oscillates the disks 129, 130 and 131 about the pivot 132. At low speeds, as when the motor 36 first begins to rotate in this direction, the three disks will oscillate as a unit and hence will have little or no effect on the operation of the motor. As the speed builds up to the point at which the waste gate 31 would ordinarily be closed so rapidly as to cause over acceleration of the turbine and compressor, and hunting or overshooting as previously described, the action changes, however. Due to the inertia of the heavier metal inertia disks 130 and 131 they are then unable to follow the rapid oscillation of the friction disk 129 which then begins to slip or vibrate independently of the inertia disks. The drag or friction between the contacting surfaces of the disks, and the degree of such slippage therebetween, may be readily adjusted by loosening or tightening the nut 137 by which the disks are held together.

The slippage of the disks as described serves to dissipate a part of the power or energy developed by the motor 36 and as a result causes it to run at a reduced speed. The motor thus actually runs at a higher speed when opening the waste gate, than when closing the same, and hence achieves the desired effect of preventing over acceleration of the turbine and compressor.

Figures 4 and 5

The apparatus of Figures 4 and 5 employs an eccentric 124 which is mounted on the motor shaft 123, exactly as previously described, to be rotated therewith in one direction by the unidirectional drive afforded by the self-energizing clutch or snubbing spring 125. All of these parts being identical with those shown in Figures 2 and 3 they are indicated by corresponding reference numerals.

In lieu, however, of the follower and inertia disks I provide in this apparatus a single oscillating or follower member designated generally at 140 which comprises a hollow casing of drum-like shape having sides 141—142 and an annular rim 143. A central slotted opening 144 is provided, within an annular center wall or hub 145, to cooperate with the eccentric 124 so that rotation thereof will oscillate this member 140 about a pivot screw 146 disposed near one edge and secured at 147 to the end of the motor housing. The hollow interior of the follower member 140 is partially filled with metal filings, sand or other heavy granular material, as shown at 148, and one of the sides 141 or 142 may obviously be made removable for the purpose of thus filling the member.

Operation of Figures 4 and 5

Here again the motor 36 is so arranged that the shaft 123 turns free of the eccentric 124, and is unaffected by the entire apparatus, when the motor rotates in the proper direction for opening the waste gate 31.

When the waste gate 31 is being closed, however, the shaft 123, rotating in the opposite direction, drives the eccentric 124 through the snubbing action of the spring 125 and then oscillates the follower member 140 about the pivot 146. This oscillation of the follower member 140 shifts its granular contents 148 causing the shape of the mass thereof to be changed. This has a damping effect which again dissipates a part of the energy produced by the motor causing it to run at a slower rate in this direction and closing the waste gate in a more gradual manner.

In this case the damping effect of the shifting mass of material in the follower member 140 begins as soon as the motor starts rotating in this direction and increases as the motor develops power. It will be evident, therefore, that the waste gate will be closed very gradually and without any possibility of causing over acceleration of the turbine and compressor with the undesirable effects thereof.

Figure 6

In this view I have shown the motor 36 as driving a shaft 149 which is adapted to be operatively connected to the waste gate 31. Two stages of speed reduction gears are interposed between the motor and shaft 149, one stage operating when the motor rotates in one direction while the other stage operates when the motor is reversed. Reduction gears are ordinarily used in connection with such motors and this apparatus involves merely the addition of another stage with suitable clutch means as will now be described.

A pinion 150 on the shaft 151 of the motor 36 meshes with and drives a gear 152 on a countershaft 153. This counter-shaft carries a low speed drive pinion 154 and a larger high speed drive pinion 155, both pinions being loose on the shaft. A self-energizing clutch spring 156 is provided for connecting the low speed pinion 154 to the countershaft 153 when the same rotates in one direction, and a similar, but oppositely acting, spring 157 is provided for connecting the high speed pinion 155 to the counter-shaft when it rotates in the opposite direction. These springs 156 and 157 operate exactly as does the spring 125 shown in Figures 2–5 and previously described.

The low speed drive pinion 154 meshes with and drives a low speed gear 158 on a shaft 159 which also carries a smaller high speed gear 160 meshing with the high speed drive pinion 155. A pinion 161 on the shaft 159 then drives a gear 162 on a shaft 163 which in turn carries a pinion 164 meshing with a gear 165 on the shaft 149.

*Operation of Figure 6*

The countershaft 153 is, as will be apparent, rotatable by the motor in opposite directions and the gears are so arranged that when the motor is rotating in proper direction to open the waste gate 31 the clutch spring 157 will be tightened causing the high speed drive pinion 157 to rotate with the countershaft. The shaft 149 is then rotated at a certain speed proportional to that of the motor by the action of the pinion 155, gear 160, pinion 161, gear 162, pinion 164 and gear 165. When the motor is reversed to close the waste gate the spring 156 will be tightened establishing a driving connection to the low speed drive pinion 154 which then drives the shaft 149 through the low speed gear 158, pinion 161, gear 162, pinion 164 and gear 165. However, due to the difference in relative pitch diameters of the high and low speed pinions and gears as clearly shown, the shaft 149 will in this case be driven at a slower speed relative to that of the motor, causing the waste gate to be closed gradually in the desired manner.

When either pinion 154 or 155 is not being driven, it may turn freely as required by the rotation of the gears meshing therewith.

While I have shown my invention in connection with an internal combustion engine, it is generally applicable to other forms of combustion engines. In the claims, the term "combustion engine" is to be construed as sufficiently broad to cover other forms of engines such as a jet engine. In general, it is to be understood that any suitable modifications may be made in the structure as disclosed, provided such modifications come within the spirit and scope of the appended claims. Having now therefore fully illustrated and described my invention, what I claim to be new and desire to protect by Letters Patent is:

1. In combination, a combustion engine having a compressor for supplying air to the intake manifold of the engine and a turbine powered by exhaust gases from the engine for operating the compressor, means for adjusting the operating speed of the turbine and compressor to thereby control the compressing effect of the latter, and motor means for operating said adjusting means to increase and decrease the operating speeds of the turbine and compressor, said motor means being operative to increase the operating speeds at a more gradual rate than it decreases these speeds.

2. In combination, a combustion engine having a compressor for supplying air to the intake manifold of the engine and a turbine powered by exhaust gases from the engine for operating the compressor, means for adjusting the operating speed of the turbine and compressor to thereby control the compressing effect of the latter, reversible motor means for operating said speed adjusting means, and brake means for limiting the speed of the motor while operating said speed adjusting means in one direction whereby the speed of the turbine and compressor will be increased at a slower rate than it is decreased.

3. A system for controlling the pressure of the air supplied to the intake manifold of a combustion engine having a compressor for supplying the air to the manifold, comprising in combination, a member adjustable in opposite directions for increasing and decreasing the speed of operation of the compressor and thereby controlling the compressing effect of the compressor, reversible motor means rotatable in one direction to adjust the said member to decrease the compressor speed and rotatable in the opposite direction to adjust said member to increase the compressor speed, and separate gear reduction stages operatively connected between the motor means and said member whereby the member will be adjusted slower when increasing the compressor speed than when decreasing the compressor speed.

4. A system for controlling the pressure of the air supplied to the intake manifold of a combustion engine having a compressor for supplying the air to the manifold, comprising in combination, a member adjustable in opposite directions for increasing and decreasing the speed of operation of the compressor and thereby controlling the compressing effect of the compressor, reversible motor means rotatable in one direction to adjust the said member to decrease the compressor speed and rotatable in the opposite direction to adjust said member to increase the compressor speed, and high and low speed reduction gear stages selectively operative as the motor means reverses in direction and connected to said adjusting member whereby the compressor speed will be increased by the slow speed gear stage and decreased by the high speed gear stage.

5. A system for controlling the pressure of the air supplied for combustion in a combustion engine having a compressor for supplying the air, comprising in combination, oppositely adjustable means for varying the operating speed of the compressor and thereby controlling the compressing effect thereof, a reversible motor rotatable in one direction for adjusting the said means to increase the compressor speed and rotatable in the opposite direction for decreasing compressor speed, brake means operative to limit the speed of the motor, and automatically operating clutch means for connecting said brake means to the motor when it rotates in the direction for increasing compressor speed.

6. In combination, a combustion engine having a compressor for supplying air to the intake manifold of the engine and a turbine powered by exhaust gases from the engine for operating the compressor, means for adjusting the operating speed of the turbine and compressor to thereby control the compressing effect of the latter, reversible motor means for operating said adjusting means, and means for causing said motor means to run slower in the direction in which the operating speeds of the turbine and compressor are increased than in the direction in which said operating speeds are decreased.

7. A system for controlling the pressure of the air supplied to the intake manifold of a combustion engine having a compressor for supplying the air and a turbine powered by exhaust gases from the engine for operating the compressor, comprising in combination, means for adjusting the operating speed of the turbine and compressor to thereby control the compressing effect of the latter, reversible electric motor means for operating said speed adjusting means, said motor means normally tending to run at the same speed in both directions, and means operatively connected to and driven by said motor means for limiting the speed thereof when the adjusting means is being operated in a direction to increase the operating speed of the turbine and compressor, said last named means being connected to said motor means through a one way connection and having less effect on the speed of the motor when it is operating in the other direction.

GEORGE L. BORELL.

REFERENCES CITED

The following references are of record in the file of this patent:

UNITED STATES PATENTS

| Number | Name | Date |
|---|---|---|
| 1,557,793 | Berger et al. | Oct. 20, 1925 |
| 1,816,787 | Moss | July 23, 1931 |
| 2,283,175 | Berger | May 19, 1942 |
| 1,991,756 | Lazich | Feb. 19, 1935 |
| 2,273,626 | Connell | Feb. 17, 1942 |
| 897,676 | Thompson | Sept. 1, 1908 |
| 1,591,671 | Flanders | July 6, 1926 |
| 1,942,825 | Meunier | Jan. 9, 1934 |
| 2,214,807 | Buckley | Sept. 17, 1940 |
| 1,372,502 | Grun | Mar. 22, 1921 |
| 1,346,563 | Sherbondy | July 13, 1920 |